July 27, 1954  N. H. BERLEW  2,684,552
FLY CASTING LINE
Filed Jan. 14, 1952

INVENTOR
NELSON HENRY BERLEW
BY *Albert H. Kirchner*
ATTORNEY

Patented July 27, 1954

2,684,552

UNITED STATES PATENT OFFICE 2,684,552

FLY CASTING LINE

Nelson Henry Berlew, Harford, N. Y.

Application January 14, 1952, Serial No. 266,270

5 Claims. (Cl. 43—44.98)

The present invention relates to fly casting lines, i. e., to lines for fishing or tournament use in which a lure, in the form of a lightweight fly, is secured to the forward end of a line whose opposite end portion is wound around a reel which is mounted on a rod.

Because certain desirable types of flies are extremely light in weight, and because it is necessary that the leader or length of line which is adjacent to the fly, by which it is secured to an end portion of the entire line, be very light in weight so that it will drop onto the surface of the water with a minimum of disturbance and will not sink, great difficulty has been heretofore experienced in providing lines with which long or accurate casts can be made. There was simply not enough weight in the forward end portion of the line to carry the fly to the spot intended.

In order to obviate this difficulty it has been proposed to incorporate in the forward portion of the line, near the fly, a belly, i. e., a thickened kind of line which would provide sufficient concentration of weight a short distance behind the fly. In casting with such a bellied line, the belly would take the lead in movement through the air, with both the back or rod section of the line, and the front or fly section, trailing behind the belly. The belly would fall first toward the surface of the water, with the fly trailing the belly, but by suitable manipulation of the rod the belly could be stopped momentarily in its flight while the fly would drop very lightly onto the water.

The principal difficulty heretofore has been the problem of satisfactorily joining or connecting suitably heavy belly material to line sections of the requisite lightness, and it is to this feature of a bellied line that the present invention relates.

A primary object of the invention is therefore to provide a fly casting line in which lengths of the material which is best suited to serve as front and back sections are joined to an intervening length of the best type of belly material by connections which are superior to those of the prior art in respect of strength, permanence, weight concentration and distribution, and all other factors which combine to produce a highly efficient casting line.

A preferred embodiment of the invention, which has been reduced to actual practice and been found to be entirely satisfactory, is shown by the accompanying drawing, in which.

Figure 3:
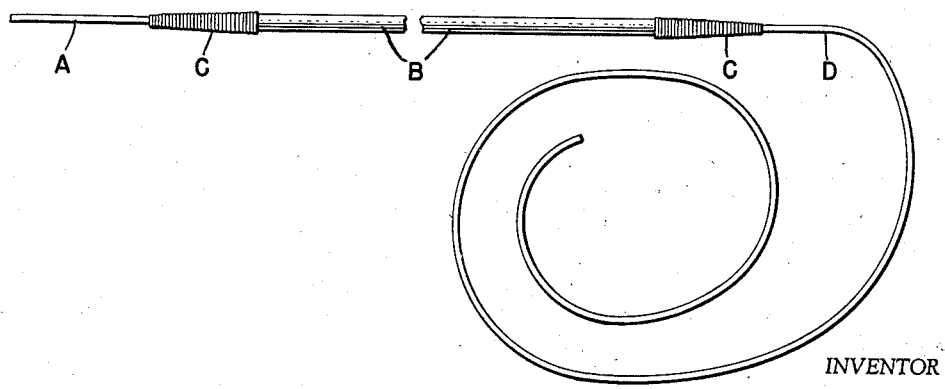
Fig. 3 is a side elevational view of a complete casting line embodying the principles of the invention, with portions of the belly and of the back or rod section broken away for economy of space.

In the drawing the reference character A designates a comparatively short length of monofilament line used as the fly or front section, and D designates a longer length of the same material used as the back or rod section of the composite casting line. These two sections are joined by splice connections C with an intermediate belly B to form a complete line as shown in Fig. 3 where the dimensions (3 feet for the section A, 25 yards for the section D, and 22 feet for the belly) are suggestive merely, and are not intended to constitute limitations to any particular lengths or proportions, of a line that will very successfully embody the inventive principles.

The monofilament of which the sections A and D are made is preferably constituted of nylon, platyl, perlon or some equivalent synthetic plastic extrusion product which is of adequate tensile strength, sufficiently fine gauge, transparency and specific gravity to function successfully in fly casting, according to principles that are well understood in the art. The present market provides a number of materials that are suitable for this purpose. They are not suitable for constituting the entirety of the line because their fineness of gauge and their lightness in weight makes it difficult or impossible to perform accurate, long casts and avoid fouling the line. It is for this reason that the interposition of a relatively heavy belly in the line is necessary. While the use of a belly is not broadly new, difficulty has heretofore been experienced in splicing the belly into the line in such a manner as to avoid friction in the rod guides and to provide the most efficient distribution and location of weight. It is in this feature of splicing the monofilament sections into the belly that the present invention resides, and these splices, designated C in the drawing, will now be described.

Figure 1:
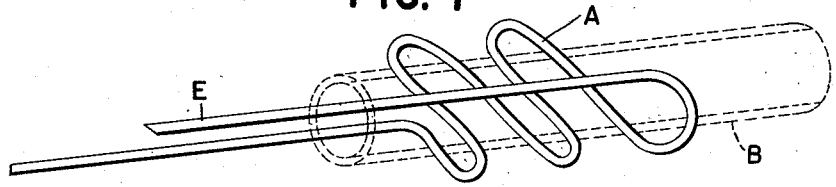
Figure 1 is a perspective, diagrammatic view on a greatly enlarged scale of contiguous portions of the belly and of one of the line sections illustrating a step in the method of making the splice connection.
Figure 2:
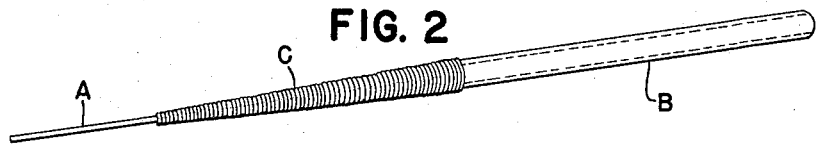
Fig. 2 is a perspective view of the line and belly portions with the splice connection completed.

The belly B is tubular and hollow, being made preferably of braided strands of fiber such as silk which is relatively heavy, i. e., of greater specific gravity than the monofilament material. Into a short portion at each end of this tube an end portion of the monofilament A or D, which has previously been threaded into the eye of a needle, is axially inserted a short distance, to a point opposite a good solid portion of the braided material, and is then thrust radially out through the tube. The needle is then advanced slightly along the tube and then thrust diametrically through the tube and pulled out on the far side. The needle is then advanced again slightly along the tube and thrust back diametrically through it. This sewing operation is continued a sufficient number of times, say five to ten penetrations, to insure a good tight hold or connection between the monofilament and the tube. The last penetration is made through one wall only of the tube, and the needle, carrying the end of the monofilament, is then withdrawn axially from the tube so as to pull the monofilament back in a run which is parallel and juxtaposed with the entering run. The loops by which the monofilament extends from the sides of the tube are then pulled up tight so as to sink into the surface of the tube, and the needle is cut from the monofilament, leaving a short length of the latter extending from the tube end along the side of the longer length of entering monofilament, as shown at E in Fig. 1.

The entire area of the splice thus far made, comprising the length E and the loops of monofilament which lie along the outer sides of the tube, is then covered by tightly winding spirally or helically around it a length of fine thread of silk, nylon or the like, as shown at C in the drawing. The convolutions of this winding are made close together to provide a tapering conformation by which the small diameter of the monofilament gradually merges into the larger diameter of the belly. The winding is then coated with a good grade of spar varnish which serves to hold the winding in place, waterproof the area, and make the surface of the splice quite smooth.

It will be understood that both of the splice connections C shown in the drawing, one at each end of the belly, are made in the same way.

The splice connection provided by the present invention has been thoroughly tested in actual practice and found to be exceedingly strong, having in fact greater strength than the monofilament itself, as well as permanent, smooth and uniform, and possessed of the optimum weight and weight distribution.

I claim:

1. A fly casting line comprising a relatively long back or rod section and a relatively short fly or front section, both made of a similar monofilament, and an intermediate belly portion comprising a section of braided tubular line shorter than the back section and connected at its end portions to the back and front sections by splices in which the adjacent end portion of each monofilament extends axially into the belly portion and then extends back and forth laterally of the belly portion to provide loops through diametrically opposite sides of the wall thereof and terminates in a short length of monofilament which extends back axially within the belly portion paralleling the first named axially extending portions of monofilament, in combination with a fine thread wrapped helically around the adjacent end portions of monofilament sections and belly portion and concealing and securing the loops.

2. A fly casting line as claimed in claim 1, in which each of the helical wrappings is impregnated with a solidified liquid coating which holds the wrapping in place.

3. A fly casting line as claimed in claim 1, in which each of the helical wrappings is tapered from a larger diameter overlying the belly portion to a smaller diameter which overlies solely the monofilament.

4. A fly casting line as claimed in claim 1, in which the ratio of the belly portion length to the front section length is approximately seven to one.

5. A fly casting line comprising a relatively long back or rod section and a relatively short fly or front section, both made of a similar monofilament, and an intermediate belly portion comprising a section of braided tubular line shorter than the back section and connected at its end portions to the back and front sections by splices in which the adjacent end portion of each monofilament extends axially into the belly portion and then extends back and forth laterally of the belly portion to provide loops through diametrically opposite sides of the wall thereof which are sunk into said wall and terminates in a short length of monofilament which extends back axially within the belly portion paralleling the first named axially extending portions of monofilament, the loops being sunk into the normally circular contour of the belly portion and thereby effecting no appreciable change in said contour, in combination with a fine thread wrapped helically around the adjacent end portions of monofilament sections and belly portion and concealing and securing the loops.

References Cited in the file of this patent

UNITED STATES PATENTS

| Number | Name | Date |
|---|---|---|
| 2,164,296 | Wilcox | June 27, 1939 |
| 2,250,832 | Hedge | July 29, 1941 |
| 2,577,046 | Jones | Dec. 4, 1951 |